Aug. 11, 1970             G. D. WILLITS            3,524,089
DYNAMOELECTRIC MACHINE WITH EASY ACCESS
TO CIRCUIT CONTROL TERMINALS
Filed Jan. 31, 1969
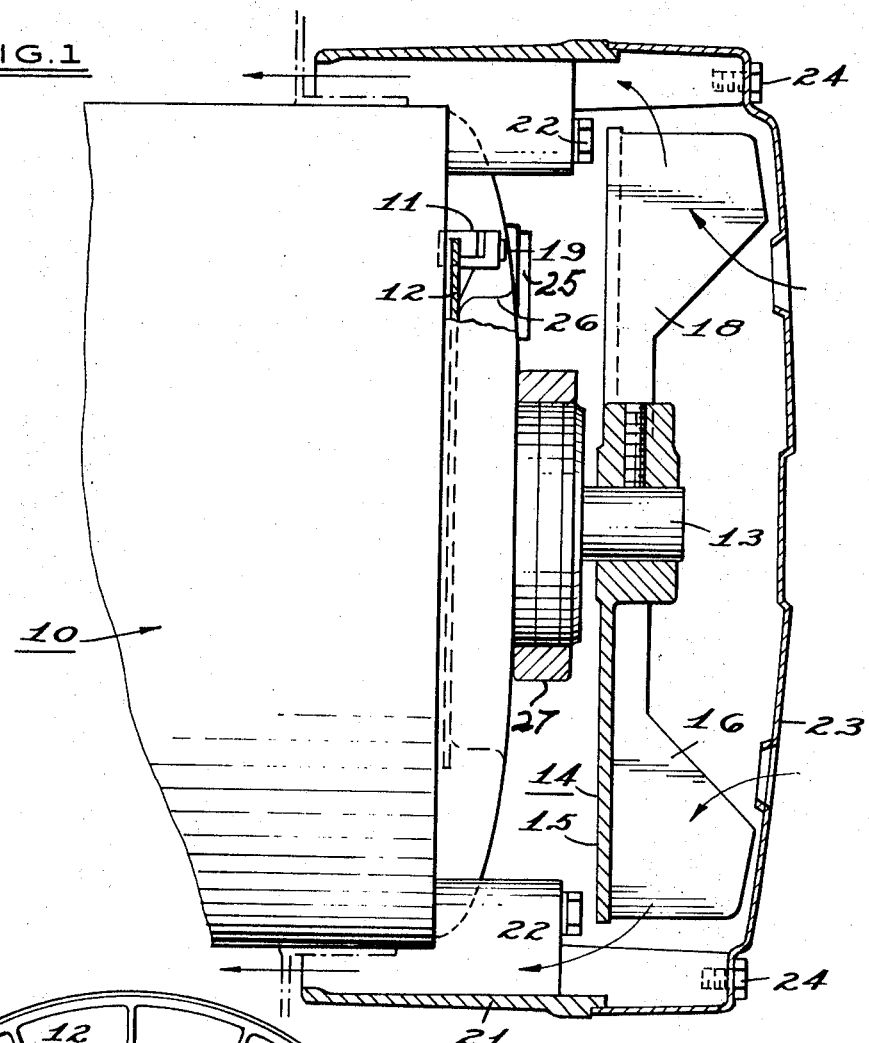
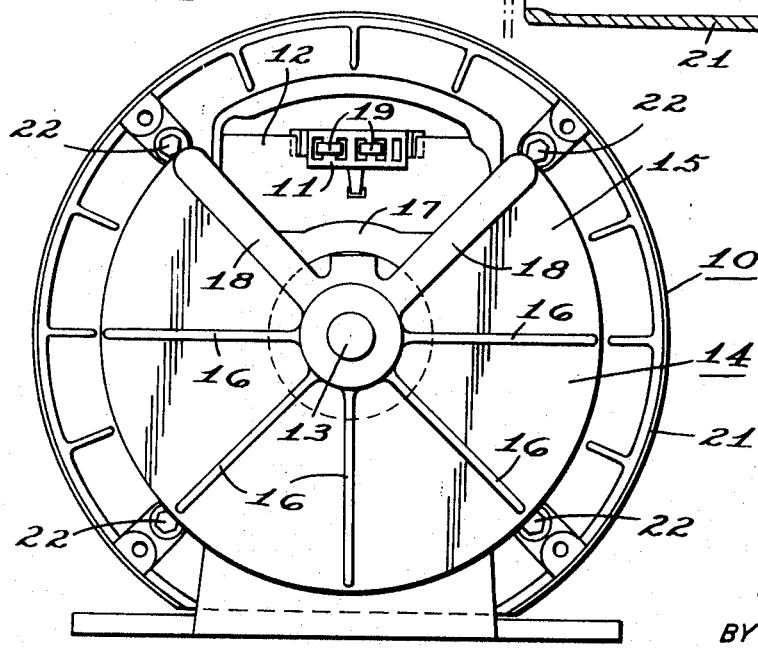
INVENTOR
GLENN D. WILLITS
BY
Allard A. Braddock
ATTORNEY

United States Patent Office 3,524,089
Patented Aug. 11, 1970

3,524,089
DYNAMOELECTRIC MACHINE WITH EASY ACCESS TO CIRCUIT CONTROL TERMINALS
Glenn D. Willits, Auburn, Ind., assignor to General Electric Company, a corporation of New York
Filed Jan. 31, 1969, Ser. No. 795,592
Int. Cl. H02k 9/06
U.S. Cl. 310—60      6 Claims

ABSTRACT OF THE DISCLOSURE

Access to internally positioned winding control terminals through the fan of a totally enclosed fan-cooled dynamoelectric machine such as an induction motor is provided by an open segment of the fan which may be rotated into alignment with the control terminals. The fan is balanced by making the blades on each side of the open segment heavier than the rest of the blades.

BACKGROUND OF THE INVENTION

A conventional type of fan-cooled electric motor has circuit control terminals positioned on the interior of the motor adjacent one set of end turns of the stator windings. An outboard cooling fan is positioned on the side of the control terminals away from the end turns. The fan usually consists of a disk having a number of radially extending spaced blades projecting from a surface thereof. As a result, the circuit control terminals are inaccessible until the fan is removed from its shaft. This necessitates removal of the fan housing and the fan in order to expose the circuit control terminals and perform such functions as reversing the direction of rotation of the motor, changing the voltage setting, etc. Improved accessibility of these terminals is highly desirably in a motor.

SUMMARY OF THE INVENTION

The invention has as its aim the provision of a motor in which the circuit control terminals are accessible without necessitating removal of the fan.

BRIEF DESCRIPTION OF THE DRAWING

The objects, features and advantages of the invention will appear more clearly from the following detailed de- description of the preferred embodiment thereof made with reference to the drawing in which FIG. 1 is a plan view partly in section showing one end of a dynamoelectric machine embodying the features of this invention; and FIG. 2 is an end view of the machine of FIG. 1 with the end cover removed to reveal the fan structure.

DESCRIPTION OF PREFERRED EMBODIMENT

In the preferred embodiment of the invention illustrated in the drawing, an electric motor 10 has circuit control elements 19 positioned for manually selective connection in a terminal block 11 mounted upon a terminal board 12 positioned in a terminal box 26. Control circuits have not been illustrated as they play no part directly in the present invention. However, such circuits are illustrated in the co-pending application of Willits and Seely, Ser. No. 796,814, filed Feb. 5, 1969, assigned to the same assignee as the present application and incorporated herein by reference.

The motor 10 includes a cushion ring 27 for a rotatable shaft 13 on which is mounted a cooling fan 14. The fan 14 consists of a disk 15 and a number of spaced upstanding radially extending blades 16 and 18 projecting from a surface of the disk 15. It is to be noted that the fan 14 is positioned exteriorly of the terminal block 11 and provides a cooling air overflow as indicated by the arrows. As a result of its exterior positioning, the fan is in a position to block access to the terminal block 11.

Referring particularly to FIG. 2, it is to be noted that the fan blades are positioned at 45° intervals except for an open segment indicated at 17. There is no fan blade or disk at this open segment and the blades 18 at each edge of the segment are thicker, and therefore, heavier, than the blades 16 farther removed from the open segment 17. The blades 18 are made heavier in order to overcome the imbalance in the fan which would otherwise be present due to the absence of disk material from the open segment 17. As a result, the fan will rotate smoothly during operation of the motor 10.

The motor illustrated is sometimes identified by the initial designation TEOF which stands for "Totally Enclosed Outboard Fan." The fan housing consists of an annular diffuser casting 21 maintained in position around the shell by a number of spaced bolts 22 and an end cover member 23 attached to the diffuser casting 21 by means of a number of spaced bolts 24. The cover member 23 may be considered an access opening to the fan as it may be easily removed by removing the bolts 24 or the cover member may be provided with an access opening (not shown) substantially coextensive with the open segment 17 of the fan 14.

The motor of this invention provides easy access to the terminal board 12. It is only necessary to remove the fan cover member 23 and to rotate the fan 14 to the place where the open segment 17 is in alignment with the terminal box cover 25 for removal, hence access to the terminal board 12. The open segment 17 enables terminal connections to be made to perform such functions as reversing the direction of rotation of the motor or changing the voltage setting (in dual voltage motors) without removal of the fan 14. This feature is particularly important in applications where the motor is already positioned in a cramped space where working room is lacking.

While the invention has been described with reference to a particular embodiment thereof, it is obvious that there are alternative constructions which fall within the proper scope of the invention. For example, the fan may have a different number of blades and the open segment may be larger or smaller than the 90° opening illustrated as the need may dictate. Accordingly, it is intended that the scope of the invention be limited only as may be necessitated by the scope of the appended claims.

What I claim as new and desire to secure by Letters Patent of the United States is:

1. A dynamoelectric machine comprising a frame, a stator mounted within said frame and carrying start and main windings having end turns projected beyond the side faces of said stator, a winding circuit control unit within said frame adjacent one set of end turns, and a fan mounted within said frame outside of said winding circuit control unit, said fan having a plurality of fan blades radially mounted upon a disk having an open segment to provide access to said winding control when the open segment is in alignment therewith.

2. A dynamoelectric machine as claimed in claim 1 in which the open segment provides an opening of nearly 90° through said disk.

3. A dynamoelectric machine as claimed in claim 1 in which the fan has seven blades spaced 45° apart on the closed portion of the disk.

4. A dynamoelectric machine as claimed in claim 3 wherein the fan is balanced by weight-balancing blades adjacent each side of the open segment.

5. In a dynamoelectric machine of the type in which a cooling fan comprises a flat disk member having upstanding radially extending spaced blades projecting from one surface thereof and the terminal box cover and the circuit control terminals are positioned between the fan disk and windings of the machine, the improvement which comprises: an access opening for said terminals through the fan disk, said fan access opening being provided by omitting a spaced fan blade and a segment of the fan disk from the space adjacent the omitted blade.

6. A dynamoelectric machine as claimed in claim 5 wherein the fan is statically balanced by means of a weight-balancing fan blade on each side of the fan access opening.

References Cited

UNITED STATES PATENTS

| 1,057,282 | 3/1913 | Schaeffer | 310—62 X |
| 1,646,962 | 10/1927 | Hillix. | |
| 2,097,205 | 10/1937 | Cary et al. | |
| 2,590,058 | 3/1952 | Willits | 310—71 |
| 2,976,352 | 3/1961 | Atalla | 230—117 |
| 3,047,752 | 7/1962 | Peterson | 310—57 X |
| 3,213,304 | 10/1965 | Landberg et al. | 310—57 X |
| 3,293,461 | 12/1966 | Uemura et al. | 310—57 |

FOREIGN PATENTS

| 528,150 | 7/1956 | Canada. |

DONOVAN F. DUGGAN, Primary Examiner

U.S. Cl. X.R.

310—62, 68, 71; 230—120; 74—573